United States Patent Office 2,746,114
Patented May 22, 1956

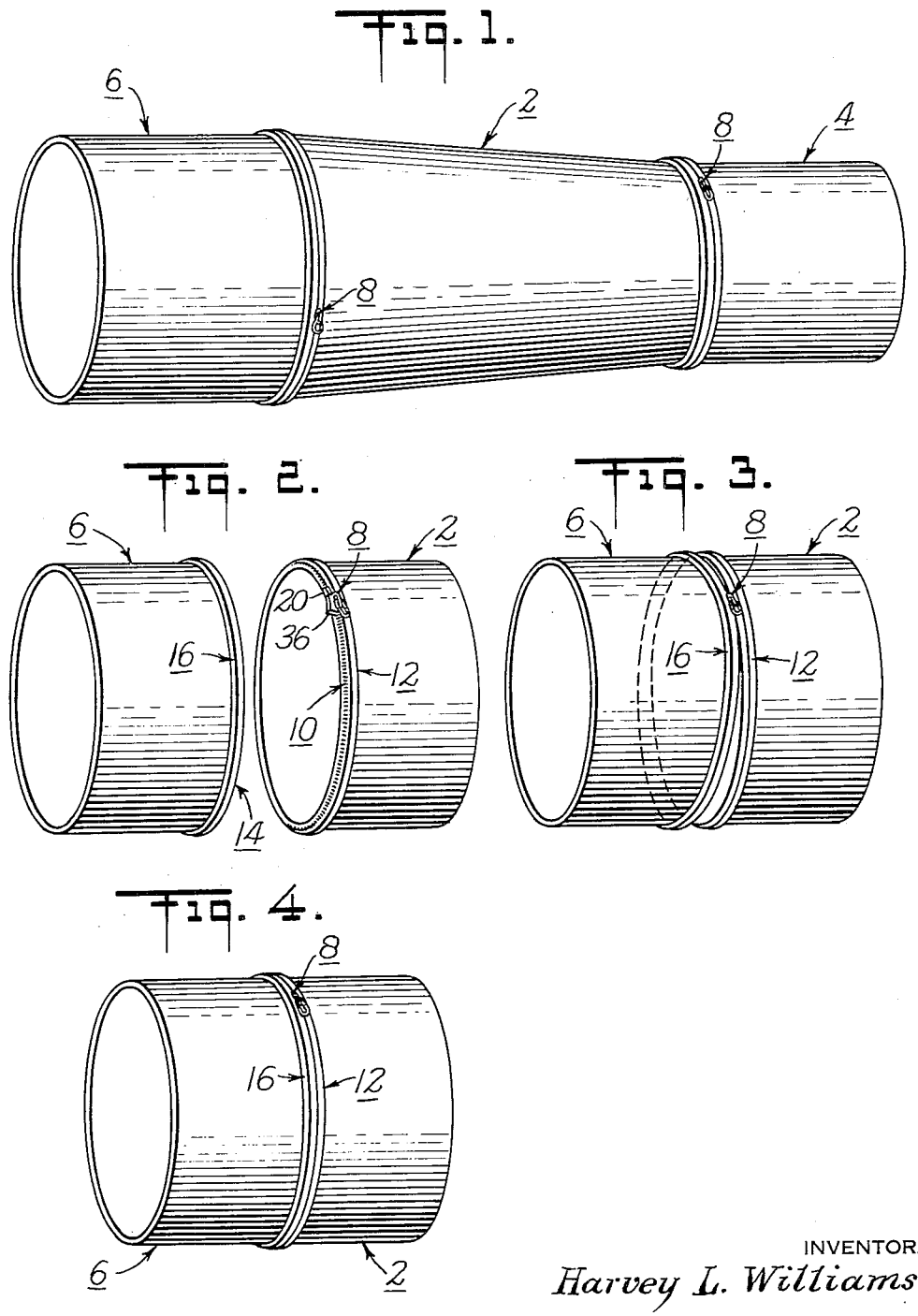

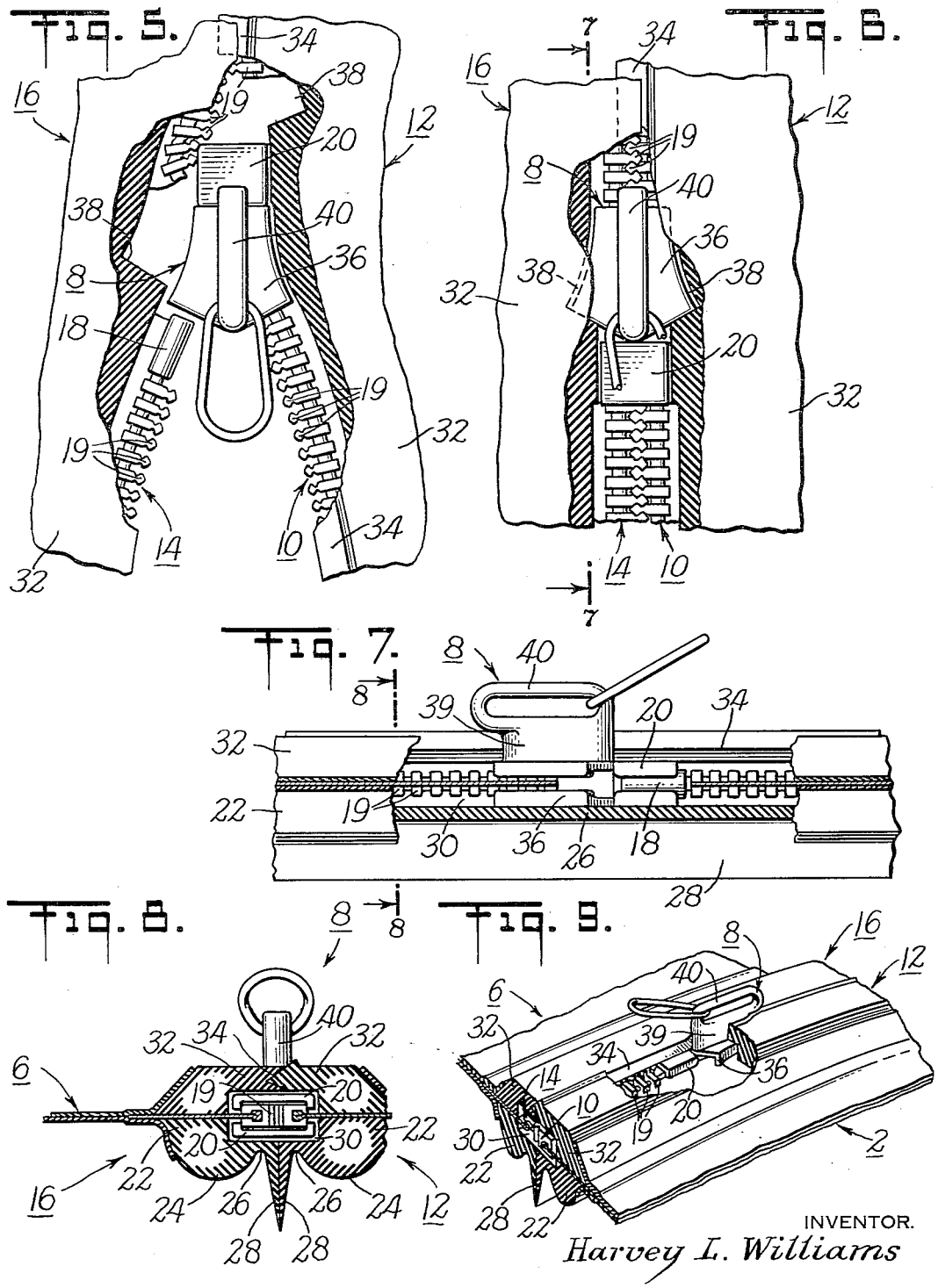

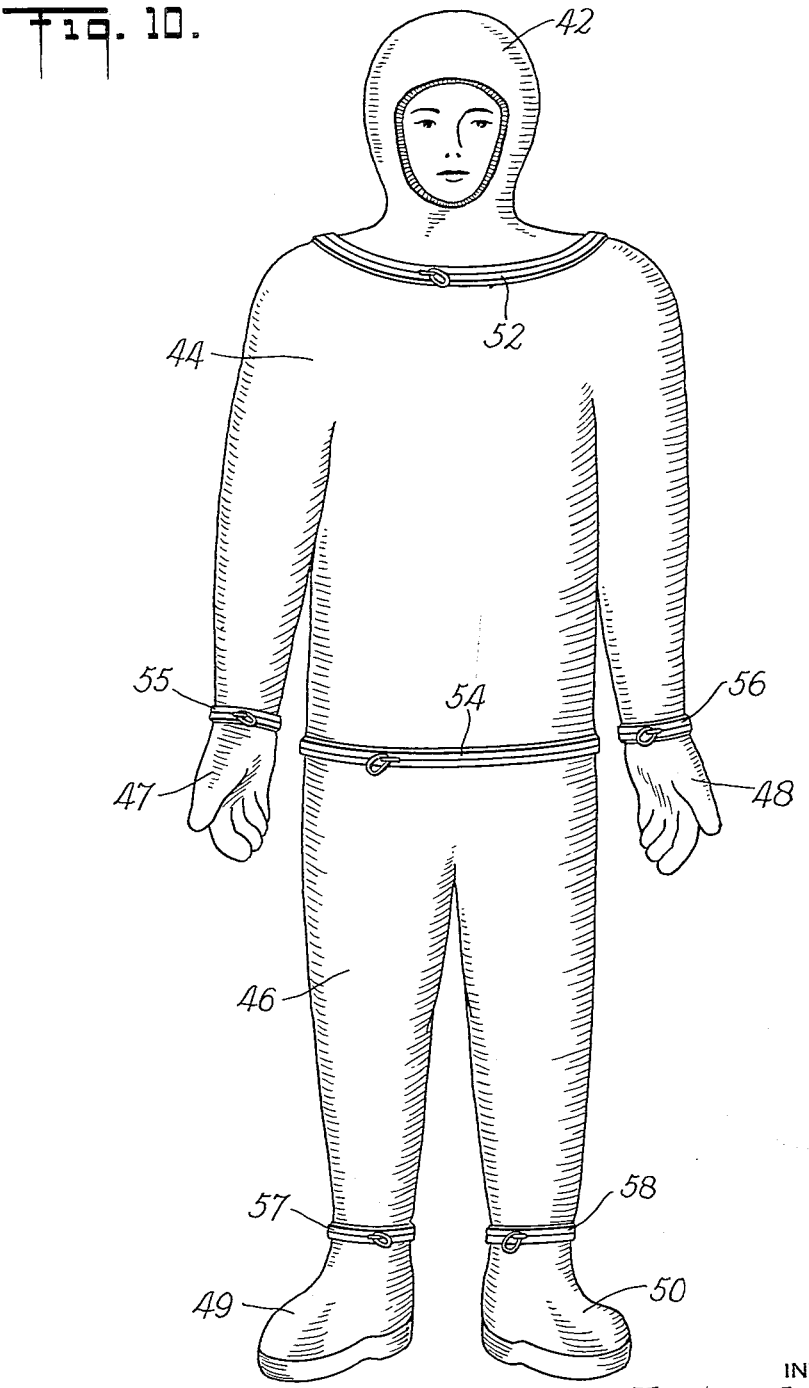

2,746,114

SLIDE FASTENER TYPE TUBE COUPLING

Harvey L. Williams, Pittsburgh, Pa.

Application January 16, 1952, Serial No. 266,670

3 Claims. (Cl. 24—205.1)

This invention relates to a tube coupling for tubular enclosures, ducts or conduits and the like made up of a plurality of separably connected sections, and more particularly to couplings for separably fastening, securely joining and, if necessary, hermetically sealing together the adjacent ends of successive tubular sections.

Ducts or conduits made up of separable rigid sections secured end to end by various types of joints are well known and extensively used but lack ready adaptability to certain requirements such as quick removal of one section without disturbing other sections, ability to give a pressure-tight seal without using tools, etc. For example, the oil cooler of an airplane engine must constantly be blown with air from air scoops to maintain the oil at the proper temperature. This air is gathered by an air scoop and is led by a pressure-tight duct to the oil cooler unit located at some distance from the engine. The duct is located within the airplane wing and accordingly occupies extremely cramped quarters, particularly in the case of small pursuit or fighter planes.

The conventional oil cooler ducts for airplanes must, of course, be as light in weight as possible but even so are substantially rigid and of sufficient length to give rise to installation difficulties. Because of their unitary rigid construction routine inspection and maintenance are not readily effected. Then, too, in many cases the duct is not straight but must curve one way or another to avoid structural members or the like. This, of course, greatly complicates installation, inspection and maintenance. When the oil cooler or engine are to be removed, it is ordinarily necessary to disconnect the duct, and that has presented serious problems.

Elaborate duct systems also characterize many air conditioning or ventilating installations. In such systems the individual sections of the duct are customarily riveted or soldered together in such a manner that not only is the initial assembly of the duct sections a tedious, time-consuming job but also repair and maintenance can only be effected at the expense of considerable effort and often irreparable damage to one or more of the sections.

Under certain circumstances the necessity arises for rapid installation of a leak-proof duct system capable of conducting a liquid or gaseous fluid under pressure from a source of supply to the point of use. Very often such a duct is a temporary installation to meet pressing but temporary need. Conventional ducts cannot meet such a need efficiently because of the time it takes to weld or thread together the duct sections. Then when the need for such a duct no longer exists its reclamation is practically impossible because of the difficulty of separating the duct into its original sections.

Another field of application of the invention is in removable covers for various containers. Hinged covers have often been provided with slide fasteners, but where the cover is required to be removed completely and yet to be fastened thruout its circumference—no suitable fastening has been available until the present invention.

A special case of tubular enclosure is the immersion clothing to be worn by divers, seamen, aviators and sportsmen when faced with necessity or likelihood of immersion in cold water. It is of utmost importance in such case to keep one's clothing dry to avoid excessive chilling of the body. Waterproof coveralls made in one piece are clumsy, difficult to put on and often interfering with free movements of the body. A two-piece suit the top of which can be pulled on like a shirt over the head and arms and the bottom of which can be pulled on like a pair of pants is much more convenient; but it presents the problem of making a quick, secure and watertight connection between the top and bottom parts of the suit.

It is accordingly among the objects of my invention to provide a circular fastening for duct systems and for tubular enclosures of various kinds, which obviates the aforementioned difficulties in a thoroughly practicable and efficient manner. To this end the invention aims to provide a separable fastening for joining, and when necessary hermetically sealing, adjacent ends of successive tubular sections which may be quickly and easily manipulated to effect the desired junction of the adjacent ends and as quickly and easily manipulated to permit the complete disconnection of said ends when desired.

An important feature of the invention is the provision of a fastener, having the characteristics aforementioned, which is adapted to produce a flexible and cushioned junction if desired between adjacent ends of the duct, etc., the advantages of which will readily be apparent, particularly when the duct is employed in places where it is subjected to considerable vibration.

Another important feature of the invention is the possibility it provides for sealing the tubular device at the coupling to insure fluid tightness which are so constructed and arranged that the higher the internal pressure in the duct the tighter the seal.

Other objects, important features and advantages of the invention to which specific reference has not hereinabove been made will appear hereinafter when the following description and claims are considered in connection with the accompanying drawings, in which—

Figure 1 is a perspective view of a duct made up of separable sections securely and hermetically joined together by the novel fastening means and in the novel manner of the present invention;

Figure 2 is a perspective view of portions of two sections separated, this figure showing the ends of the sections which have the cooperating fastener means thereon;

Figure 3 is a perspective view of the section portions shown in Figure 2 with the slide fastener elements brought into their initial interengaging relation to each other;

Figure 4 is a perspective view of the section portions shown in Figures 2 and 3, this view showing the slider of the slide fastener in the position which it assumes when it has completed the joining of the sections;

Figure 5 is an enlarged plan detail, partly in section, showing a manner of bringing the slide fasteners of two sections into their initial engagement with each other;

Figure 6 is a view similar to Figure 5 but showing the slider and box in the relation which they bear to each other when the joining of the sections has been completed;

Figure 7 is a longitudinal section taken on line 7—7 of Figure 6 with parts broken away to disclose the slider, box, pin, and teeth in the positions which they occupy in Figure 6;

Figure 8 is a section on the line 8—8 of Figure 7 looking in the direction of the arrow shown in Figure 7;

Figure 9 is a perspective view, partly in section, of the fastener at the end of the joint connecting and sealing movement of the slider; and Figure 10 is a view in elevation of a garment.

The embodiment of the invention shown in Figure 1 of the drawings is an air duct such as is used in large aircraft for cooling air. Only a part of the duct of conduit is shown; but a part including a removable section, and therefore including two separable couplings embodying structural features of the invention. In this figure the removable section is indicated by the reference numeral 2 and parts 4 and 6 of a duct to which it is coupled in accordance with the present invention are shown in coupled relation, that is, with the sliders 8 engaging the slide fasteners and at the ends of their fastening travel.

In Figure 2 the sections 2 and 6 are shown each broken away and axially separated to illustrate the separability. In Figure 3 the fragmentary sections 2 and 6 are shown in process of coupling at the beginning of the slider movement to effect the interengagement of the fasteners, the pin 18 (see Figure 5) of the fastener chain on section 6 having been introduced through the slider 8 into the box 20 of the fastener chain on section 2. Figure 4 shows the completion of the fastener operation begun in Figure 3 and in this respect is similar to Figure 1.

The structure of the fasteners employed to join the adjacent edges or ends of successive sections of the duct or conduit, to provide a readily separable but hermetically tight joint, is shown in greater detail in Figures 5 to 9 inclusive of the drawings. This is the subject of my copending application Serial No. 661,025, filed April 10, 1946.

As shown, particularly in Figure 9, there is secured to the left hand end or edge of each of the duct sections 2 and 4 shown in Figure 1, one-half 10 or 14 of a slide fastener with a waterproof flexible tape 12 which is continuous, endless or annular and is permanently secured to the edge of the duct section with which it is associated. The slide fastener part 10 carries at all times the slider 8 of the fastener and the box 20. The other half 14 of the slide fastener has a waterproof tape 16 secured to the right hand edge or end of its section 2 or 6. This part 14 of the fastener carries the anchor pin portion 18 of a separable fastener. The end of the pin portion 18 is inserted through the slider 36 into the box 20 in order to bring into cooperative relation the teeth 19 (usually called the "scoops" in the slide fastener industry). The slider 36 can then be pulled along the fastener chain 10 causing it to intermesh with chain 14. The box 20 and the pin 18 may be of the usual construction employed in separable slide fasteners.

On each of the tapes 12 and 16 there are secured, as for example by cementing thereto or by vulcanizing in situ, sealing strips 22 of rubber or other resiliently deformable fluid-tight material. As shown in Figures 8 and 9 and more fully set forth in my said prior application Serial No. 661,025, filed April 10, 1946, these sealing strips 22 comprise buttress portion 24 of relatively thick cross section, the under surface of which adheres to the tape, a hinge portion 26 of reduced thickness and a lip portion 28 which tapers outward to substantially a feather edge. The under side of the strip is recessed at 30 to provide clearance for the slide fastener chains and for the relatively free movement of the slider 8. In general, this clearance is sufficient to avoid any wedging action by the edge of the slider 8 which would tend to pry up the inner edge of the strip 22 off from the tape 12 or the tape 16. Counter-balancing strips 32 are used on the opposite side to hold the strips 22 pressed together; although there is surprising advantage in the use of this type of fastener as shown, other waterproof slide fasteners can be substituted within the scope of my broad invention.

When the duct is to carry an internal pressure, the strips 22 with their lips 28 are on the inner periphery of the annular slide fastener construction above described so that when the ends of the duct sections are joined by the slide fastener the lips 28 project into the pressure carrying interior of the duct. Under this condition there is no interference between the closure of the lips and the bail of the slider. As pointed out more fully in my copending application above referred to, since the lips 28 are pressed together by their own inherent resiliency and since they are resiliently flexible, they form a tight seal. Being on the inside of the conduit when the sections are joined, the greater the fluid pressure to which this seal is exposed the tighter the lips will be pressed together and the tighter consequently will be the seal between them. If the duct carries vacuum or if the tube coupling is used on a garment or enclosure to protect against immersion the strips 22 will be on the outside.

As in the fastener construction of my copending application above identified, strips 32 or other counterbalancing abutments are secured to the opposite faces of the tapes 12 and 16. These strips 32 as shown meet in a tongue and groove lock 34 to better keep the edges in abutting relation. They may meet in a contact between plane surfaces also. The strips 32 may provide additional sealing of the joint, but that is not necessary; their primary purpose is to counterbalance the reaction forces of the compression of the lips 28.

The sealing of the fastener at the end of the fastener closing movement of the slider 8 is effected by pressure of lips against each other free from slider interference. When the lips are external, this sealing around the slider may be effected substantially in the same manner as the sealing of the fastener at the end of the fastener closing movement of the slider in my said copending application, except that the sealing in the present case will, of course, take place immediately adjacent to the rear end of the box 20. As shown more fully in Figure 6, to prevent the leaving of a gap between the tapes at the end of the slider when it is pulled to the end of its closing movement, notches 38 may be cut, molded or otherwise arranged into the portions 34 and 32 of the sealing strips just behind the box 20 and the pin 18. The diverging ends 36 of the slider are received in these notches 38 and thus avoid holding the sealing strips apart. Furthermore, several scoops 19 are omitted at the ends of the fastener chains just behind the box 20 and pin 18 so that the tapes 12 may lie substantially straight in the nose portion 36 of the slider 8. Some of the scoops 19 on the connected chains should lie engaged together in the narrow part of the slider just behind the frog.

A draft fin 39 between the bail 40 and the body or main part of the slider 8 is shown as tapered substantially to an edge at each end so as to minimize distortion of the rubber strips. This is more important when the lips 28 are on the outside, in which case they must press against the part 39 with a pressure-tight seal and fin 39 must be shaped to avoid any leakage gap at its ends.

The slide fasteners at opposite ends of the removable section 2 are most advantageously opposite-hand fasteners, i. e. both sliders or both pins 18 are on the removable section. In general with both male elements such as the anchor pins on the removable section of the conduit, the removable section will be easier to install or remove.

When tubular parts are to be joined, they are brought into coaxial relation with their edges substantially touching and one section rotationally displaced relative to the adjacent section just enough so that the pin 18 on one comes at the mouth of the adjacent slider over the end of the box 20 on the other, or vice versa. With the pin and box at each end of the section thus aligned, the section is rotated to drive the pins through the sliders into the boxes; and then the sliders are pulled around the circle till they abut the back ends of the boxes, thus bringing the fastener chains into engaged relation throughout their length. When this process is reversed, the sections are released and the central section 2 can be removed.

From the foregoing description, it will be seen that the sectional duct or conduit of the present invention, with its novel means for separably joining the successive sections, has a wide field of utility because of the ease and speed with which the successive sections of the duct or conduit may be joined or disconnected from each other without the use of special tools. It will further be seen that, by reason of the novel construction of the separable fastening, not only may the joining and separation of the sections be easily and quickly effected when strips 22 and 32 are omitted but a hermetically tight joint will be insured merely by the movement of the slide fastener to the end of its fastener closing travel when strips 22 and 32 are embodied in the construction of the fastener.

In Figure 10 is shown one example of a garment embodying the invention. In the garment shown, a helmet section 42 is secured to a shirt section 44 and the latter to the pants section 46 and to the gloves 47 and 48, and the pants to boots 49 and 50 by the tube coupling fasteners 52, 54, 55, 56, 57, 58, each of which may be as shown and described in Figures 1–9. In case the suit is to be used under conditions where external pressure may exceed internal pressure, as in foul weather suits, and in shallow water diving suits where the suit is not to be filled with air pressure, the coupling would be similar but with the sealing lips 28 on the exterior and the abutment strips 32 on the inside. Where internal air pressure is to be maintained in the suit, the sealing lips 28 would be on the interior and the abutment strips 32 on the exterior.

I claim:

1. A tube coupling comprising continuous flexible bands of slide fastener chain secured to the adjacent edges of the tubes to be joined; continuous resilient sealing strips mounted on one side of said interengaged fastener chains and arranged to be forced into tight interengagement when the fastener chains are interengaged but yieldable to permit passage of a draft fin of a slider therebetween; counterabutment strips mounted on the opposite sides of said bands to insure the tight engagement of said continuous resilient sealing strips and to seal the other surface of said coupling; an anchor receiving box secured on one of said chains and disposed between said sealing and counterabutment strips; a slider on said chain on which said box is mounted, said slider having a draft fin extending between said sealing strips with pulling means attached outside of said sealing strips; an anchor on the other chain adapted to pass through the slider into the box for engagement therewith; and a recess in each of said resilient and counterabutment strips just behind said box to receive the ends of said slider and permit said sealing and counterabutment strips to overlap thereover, to form a fluid tight seal about the abutting head and tail of said coupling.

2. A tube closure comprising a continuous flexible band of slide fastener chain secured to the adjacent edges of the tubes to be joined, a continuous resilient sealing strip mounted on one side of said bands, a complementary continuous counterabutment strip mounted on the opposite side of said bands, said strips being arranged to be forced into tight sealing engagement when the fastener chains are interengaged to seal the joint fluid tight, a chain terminating box mounted on one of said fastener chains, a slider mounted on the chain carrying said box, said box and slider being adapted to receive a mating portion of said other chain; and a slider-receiving chamber in said resilient sealing and counterabutment strips just behind said chain terminating box.

3. A tube closure comprising a continuous flexible band of slide fastener chain secured to the adjacent edges of the tubes to be joined, a continuous resilient sealing strip mounted on one side of said bands, a complementary continuous counterabutment strip mounted on the opposite side of said bands, said strips being arranged to be forced into tight sealing engagement when the fastener chains are interengaged to seal the joint fluid tight, operating means mounted on one of said chains to receive mating portions of said other chain, and recesses in said resilient sealing and counterabutment strips to receive said chain operating means when in chain closing and end abutting relationship to permit said strips to move together in sealing relationship about said operating means.

References Cited in the file of this patent

UNITED STATES PATENTS

| | | |
|---|---|---|
| 1,310,559 | Braly | July 22, 1919 |
| 1,970,129 | De Martinez | Aug. 14, 1934 |
| 2,062,596 | Monette | Dec. 1, 1936 |
| 2,130,690 | Lemoine | Sept. 20, 1938 |
| 2,410,632 | Colley et al. | Nov. 5, 1946 |
| 2,521,174 | Krupp | Sept. 5, 1950 |
| 2,557,827 | Krupp | June 19, 1951 |